Jan. 31, 1967   R. L. THOMAS   3,301,612
BEARING HOUSING CARTRIDGE
Original Filed April 26, 1962   2 Sheets-Sheet 1
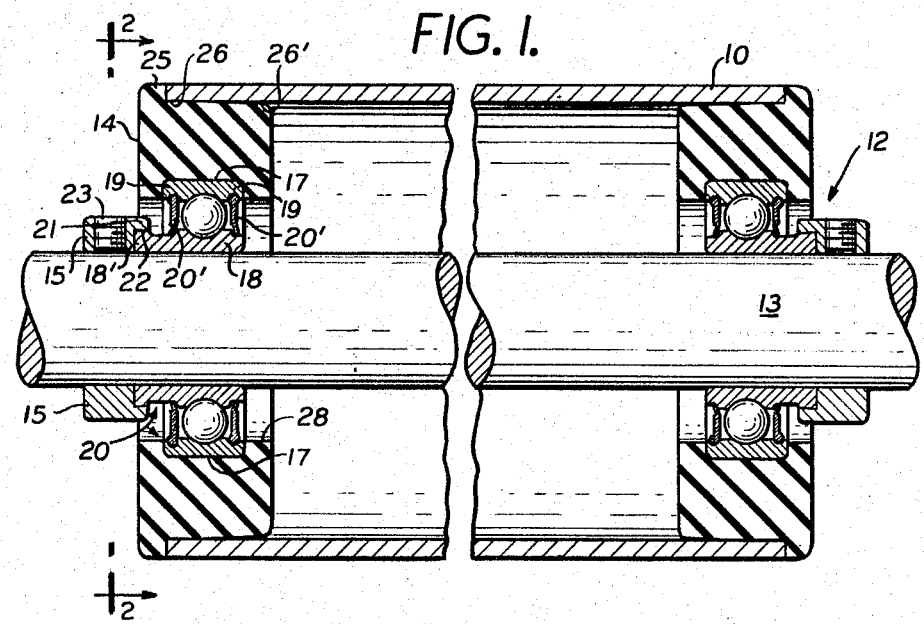
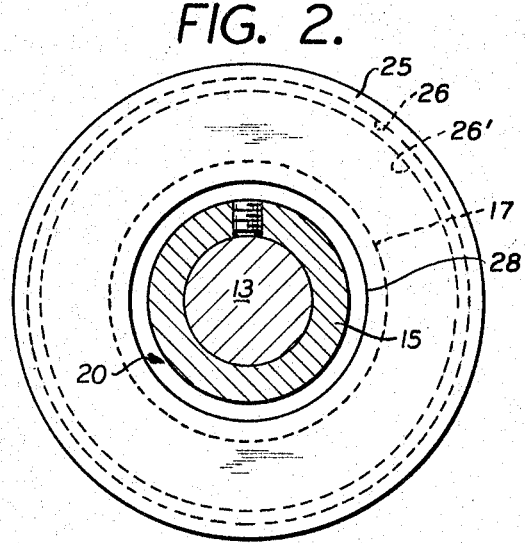
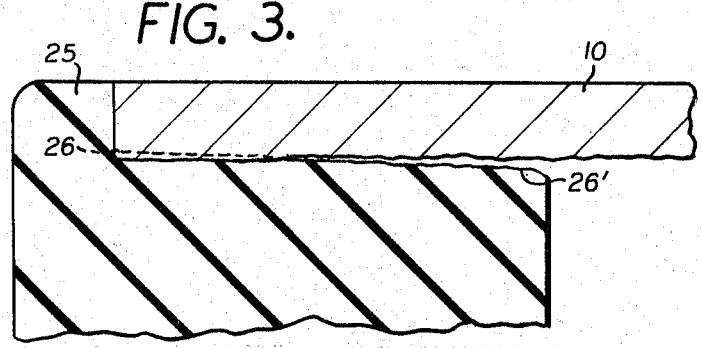
INVENTOR
ROBERT L. THOMAS
BY Roy C. Hopgood
ATTORNEY.

INVENTOR
ROBERT L. THOMAS
BY Roy C. Hopgood
ATTORNEY.

United States Patent Office 3,301,612
Patented Jan. 31, 1967

---

3,301,612
BEARING HOUSING CARTRIDGE
Robert L. Thomas, Farmington, Conn., assignor to The Fafnir Bearing Company, New Britain, Conn., a corporation of Connecticut
Continuation of abandoned application Ser. No. 190,380, Apr. 26, 1962. This application May 20, 1965, Ser. No. 459,527
7 Claims. (Cl. 308—20)

This invention is a continuation of my co-pending application Serial No. 190,380, filed April 26, 1962, now abandoned. It relates to an improved conveyor belt supporting roller and more particularly relates to an improved bearing housing in a conveyor idler.

Conventional idlers have an outer metallic sleeve or tube over which a conveyor belt is entrained. The hollow tube is rotatable and is supported on a bearing assembly, the inner ring of which is coupled to a fixed shaft. The bearing assembly further comprises a metallic cartridge which is fixedly coupled to the outer ring of the bearing and the inner surface of the outer sleeve.

Considerable effort is required to provide precise outer diameters of the cartridge as well as inner diameters of the outer sleeve. In order to obtain such precision diameters, considerable machining is needed, usually by a skilled operator, thereby increasing the cost of the bearing housing.

The first object of this invention is to eliminate the previously requisite steps of precisely machining the outer surface of the cartridge or the inner surface of the outer sleeve.

A second object of this invention is to replace the conventional metallic bearing housing with a flexible housing which will assemble with an interference fit in the outer sleeve. The resulting friction will prevent differential rotation between outer ring and outer sleeve.

A still further object of this invention is to provide a cartridge which may be effectively coupled to an outer sleeve over which a conveyor belt will roll in which the sleeves may have ragged edges as well as inaccurate and varying inner diameters.

Figure 4:
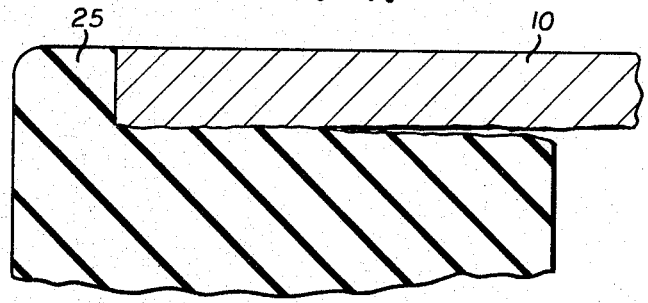
Figure 5:
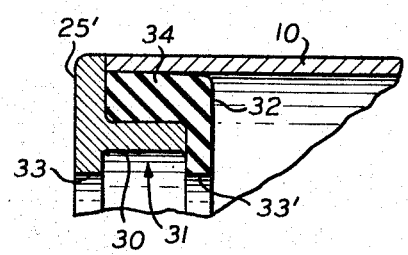
Figure 6:
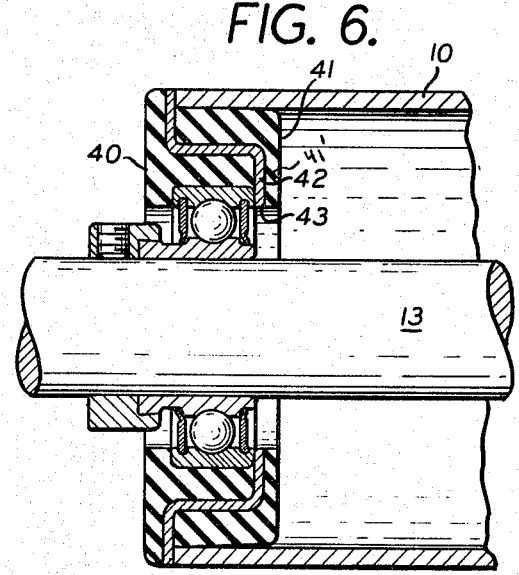

The above mentioned and other features and objects of this invention and the manner of attaining them will become more apparent and the invention itself will be best understood by reference to the following description of an embodiment of the invention taken in conjunction with the accompanying drawing, wherein:

FIG. 1 is a front sectional view illustrating the parts of this invention and their relationship to each other, FIG. 2 is a cross sectional view along 2—2 of FIG. 1, FIG. 3 is an enlarged view of the facing surfaces of the bearing cartridge and outer sleeve, FIG. 4 is an enlarged view similar to FIG. 3 illustrating another embodiment of the rubber cartridge, and FIGS. 5 and 6 illustrate related inventions using a composite metal-rubber cartridge.

Referring now to FIG. 1, there is shown a hollow metallic tube 10 forming the outer sleeve of the idler. The outer sleeve 10 is rotatably coupled to a fixed shaft 13 by the bearing assembly, indicated generally by numeral 12.

The bearing assembly comprises a rubber cartridge 14, a rotatable bearing ball or element and associated inner and outer rings 18 and 19. The inner ring 18 of the bearing assembly has a lateral extension 18' which is engaged by a surrounding eccentric locking collar 15. Locking collar 15 has a counterbore 21 which gradually tapers inwardly to fit against a complementary taper in the lateral extension 18' of inner ring 18. A locking screw 23 fits into an aperture provided in the locking collar to tighten the fit. The outer ring 19 of the bearing assembly has an inner recess to accommodate seal parts 20'.

The rubber cartridge 14 is an annular sleeve member having a hollow interior. The inner surface is annular and is indicated by numeral 28. An annular recess 17 is provided in the inner surface thereof to accommodate the outer ring 19. The outer diameter of the outer ring 19 is slightly greater than the diameter of the inner wall of recess 17 so that the race may be mounted within the cartridge with tight interference (an "interference fit").

The outer part of the cartridge comprises a circumferential flange 25 which has a height generally equal to the thickness of the wall of the sleeve 10. The flange abuts the end of the tube when the cartridge is fixed in position. The outer diameter 26 of the cartridge varies and in its maximum position has a diameter slightly greater than the inner diameter of the sleeve 10. In the preferred form of the invention, the outer diameter 26 of the cartridge is tapered inwardly at its maximum position from the flange to the inner part thereof to a diameter indicated by the numeral 26'. The outer surface of the cartridge therefore conforms to the inner surface of the sleeve 10, as well as providing an interference fit therewith. The resultant radial compression on the outer diameter of the cartridge reflects an additional squeeze on the outer diameter of outer ring 19 and hence on the inner surface of recess 17. The squeezing of the rubber caused by the interference fits provides the necessary friction force to lock the cartridge 14 to the outer ring 19 and sleeve 10. The elastomeric material is shown at 26 in the unsqueezed or noncompressed state in FIGS. 2 and 3.

Since the metal tube 10 frictionally engages rubber or the like conveyor belt static electricity may develop on the surface of sleeve 10. Therefore, cartridge 14 may be formed substantially of conductive elastomeric material such as conductive rubber which conducts the charge through the bearing of the shaft and to a ground.

The preferred taper from diameter 26 to diameter 26' is 1 degree 40 minutes. This degree of taper and the elastomeric properties of rubber allow hand assembly into conventional hot rolled, electric resistance welded seam tubing without machining of the tube. Of course, other forms of the tube may be used. Further, the outer diameter 26 may have a taper extending from the flange 25 moving inwardly and terminate at an intermediate location such as shown in FIG. 4. The taper region is shown in compression.

The circumferential flange completely covers the metallic ends of sleeve 10. Since the tubes may sometimes be cut to a length having ragged edges, the flexible flange covering the edge eliminates a safety hazard to personnel working around the conveyors who otherwise may be injured by the ragged edge if it were not so covered.

Since similar flexible cartridges are provided on opposite ends of the tube, the bearing assemblies are locked to the shaft by means of the eccentric locking collars 20 and resist thrust on the tube in either direction.

The improved bearing housing utilizing the resilient cartridge has other advantages. It allows small degrees of alignment to prevent the two bearings from being misaligned with respect to each other. Misalignment has, in the past, caused considerable numbers of premature bearings failures due to the absence of coincidence of the bearing seats in the two metal housings. It also allows the unit to be assembled into an unmachined tube forming sleeve 10 having a large inner diameter tolerance without radially preloading the bearing. The resilient material absorbs the heavy interference fits without passing it on to remove the internal clearance in the bearing. Further, the improved housing deadens noise so that any noise developed due to vibrations throughout the conveyor system is not telegraphed from roll to roll. The housings can be hand assembled into the tube allowing convenient bearing placement right at the conveyor without requiring an arbor press to remove and replace the bearing as is necessary with the metal housing.

If desired, a composite metal-rubber cartridge may be used which fits over the outer ring 19 as illustrated in FIGS. 5 and 6.

A related invention or embodiment of the invention is shown in FIG. 5. In this invention, the cartridge 31 is formed of two elements, metallic element 30 and a rubber element 32. These elements fit together to form the configuration of cartridge 14 of FIG. 1.

Metallic element 30 is a generally annular sleeve like member as is the elastomeric element 32. The inner diameter of surface 33 the same as diameter 28 of FIG. 1. An annular section 34 having an outer circumference that is tapered as the surface 26-26' of FIG. 1 is provided along with the flange 25' similar to flange 25 only somewhat longer.

The elastomeric element 32 has an annular body having an inner diameter of surface 33' the same as that of surface 33. Axially extending lips 34 are formed with tapering outer surfaces as on cartridge 14. The cross sectional view in FIG. 2 shows that the outer surfaces of metallic element 30 and the inner surfaces of the elastomeric element 32 form right angles and mate together to assume a shape similar to cartridge 14.

The composite cartridge of FIG. 6 is similar to that of FIG. 5. Elastomeric element 40 has the same shape as metallic element 30 (FIG. 5) except that the flange section is somewhat thinner to accommodate a metallic reinforcing ring 42. Elastomeric mating element 41 has the same shape as elastomeric element 32 (FIG. 5) except that the inwardly extending annular section 41' is somewhat thinner to accommodate the metallic reinforcing ring 42.

The metallic reinforcing ring 42 has two reversely formed right angled sections to abut against sleeve 10 in one side and the bearing outer ring 19 on the other section. Metallic element 42 is substantially rigid and enhances the rigidity of the cartridge to resist heavier loads placed on the conveyor belt when such is necessary.

While the foregoing description sets forth the principles of the invention in connection with the specific apparatus, it is to be understood that the description is made only by way of example and not as a limitation of the scope of the invention as set forth in the objects thereof and in the accompanying claims.

What is claimed is:

1. An idler bearing assembly for use with a metallic sleeve having a generally cylindrical inner surface comprising
    a bearing containing an outer ring,
    an annular cartridge formed of rubbery material,
    said cartridge having a radially extending flange for engaging an end of the sleeve to cover the same,
    the inner surface of said cartridge having a circumferential recess with a diameter slightly less than the outer diameter of said outer bearing ring before engagement therewith thereby providing an interference fit with said outer bearing ring,
    the outer surface of said cartridge having an axial taper for accommodating the inner surface of the sleeve when inserted therein,
    said outer surface tapering from a lowermost diameter at one end to a diameter which is slightly greater that the approximate inner diameter of the sleeve which it is adapted to accommodate,
    said taper being substantially of the order of 1° 40', to thereby facilitate manual assembly of said cartridge into the end of the sleeve,
    and said cartirdge comprising a continuously solid mass of said rubbery material in the radial space between said outer ring and said tapered surface.

2. An idler system comprising
    a hollow outer metallic sleeve having a generally cylindrical and irregular inner surface, the ends of said sleeve having relatively ragged edges,
    a first bearing assembly at one end of said sleeve, said assembly comprising a bearing containing an inner and an outer ring and an annular rubbery cartridge,
    said cartridge having a radially extending flange for engaging an end of said sleeve to cover the same,
    the inner surface of said cartridge having a circumferential recess with a diameter slightly less than the outer diameter of said outer bearing ring before engagement therewith thereby providing an interference fit with said outer bearing ring,
    the outer surface of said cartridge having an axial taper for accommodating the inner surface of the sleeve when inserted therein,
    said outer surface tapering from a lowermost diameter at one end to a diameter which is slightly greater than the approximate inner diameter of said sleeve,
    said taper being substantially of the order of 1° 40', to thereby facilitate manual assembly of said cartridge into the end of the sleeve,
    the rubbery material of said cartridge solidly filling the radial space between said sleeve and said outer ring,
    and a second bearing assembly similar to said first bearing assembly at the opposite end of said sleeve therefrom.

3. The idler system of claim 2 in which the inner ring of each bearing assembly has a projecting lip,
    an eccentric collar lock engaging each lip,
    and a stationary shaft,
    said collars locking said lips and said inner rings to said shaft.

4. The idler system of claim 2 in which said rubbery material is conductive thereby allowing the dissipation of static electricity and preventing arcing.

5. An idler bearing assembly for use with a metallic sleeve having a generally cylindrical inner surface, comprising
    inner and outer bearing rings supporting antifriction elements,
    an annular cartridge formed of two complementary mating elements, one of said elements being metal, the other of a rubbery material, the outer circumferential surface of said cartridge being defined by the element of the rubbery material,
    the inner circumferential surface of said cartridge being defined by an element of metal and cooperating with said rubbery material and providing an interference fit with said outer ring, said metal element further having a radially extending flange for covering an end of the sleeve,
    the outer surface of said cartridge having an axial taper for accommodating the inner surface of the sleeve when inserted therein,
    said outer surface tapering from a lowermost diameter at one end to a diameter which is slightly greater than the approximate inner diameter of the sleeve which it is adapted to accommodate,
    said taper being substantially of the order of 1° 40' to thereby facilitate manual assembly of said cartridge into the end of the sleeve,
    and said element of rubbery material with said metallic element comprising a solid mass in the radial space between said outer ring and said tapered surface.

6. An idler bearing assembly for use with a metallic sleeve having a generally cylindrical inner surface comprising
    inner and outer bearing rings supporting antifriction elements,
    an annular cartridge formed of a rubbery element having an intermediate metallic member embedded therein, said member having a transversely extending section, the inner surface of said cartridge having a circumferential recess with a diameter slightly less than the outer diameter of said outer ring before engagement therewith thereby providing an interference fit with said outer ring, said cartridge having a radially extending flange for engaging an end of the sleeve to cover the same, said flange including a portion of said rubbery element and a portion of said metallic member, the outer surface of said cartridge having an axial taper for accommodating the inner surface of the sleeve, said outer surface tapering from a lowermost diameter at one end to a diameter which is slightly greater than the approximate inner diameter of the sleeve which it is adapted to accommodate, said taper being substantially of the order of 1° 40', to thereby facilitate manual assembly of said cartridge into the end of the sleeve, and said rubbery element with said metallic member comprising a continuously solid mass in the radial space between said outer ring and said tapered surface.

7. An idler for a conveyor system comprising
a hollow cylindrical metallic sleeve having irregular inner and end surfaces, a bearing assembly at each end of said sleeve, each of said bearing assemblies including an inner and an outer ring, said sleeve and said outer rings substantially axially overlapping, an annular cartridge of rubber-like material at each end of said sleeve for rotatably supporting the same, said rubber-like material of each respective cartridge solidly filling the radial space between the end of said sleeve and the outer ring with which it is associated, said cartridges each having a radially extending flange at the outside thereof for covering the end of the sleeve with which it is associated, the inner surface of each of said cartridges having a circumferential recess, the diameter of each recess being slightly smaller than the outer diameter of said outer ring with which it is associated and thereby providing an interference fit with said outer ring, the outer surface of each of said cartridges having an axial taper for accommodating the associated inner surface of the sleeve when inserted therein, said outer surfaces tapering from a diameter less than the approximate diameter of said sleeve at the inside of said cartridges to a diameter slightly greater than said approximate diameter before assembly with said sleeve, said taper being substantially of the order of 1° 40', whereby each cartridge becomes firmly engaged in the end of the sleeve with which it is associated by pressing the same into the respective end of said sleeve.

References Cited by the Examiner

UNITED STATES PATENTS

| 2,728,616 | 12/1955 | Potter | 308—236 |
| 2,797,944 | 7/1957 | Riesing | 277—179 |
| 2,851,140 | 9/1958 | Kindig | 192—37 |

FOREIGN PATENTS

| 1,101,288 | 4/1955 | France. |
| 761,286 | 11/1956 | Great Britain. |
| 818,901 | 8/1959 | Great Britain. |

MARTIN P. SCHWADRON, *Primary Examiner.*

FRANK SUSKO, *Examiner.*